Oct. 9, 1945.   G. A. LYON   2,386,241
WHEEL STRUCTURE
Filed Sept. 6, 1943
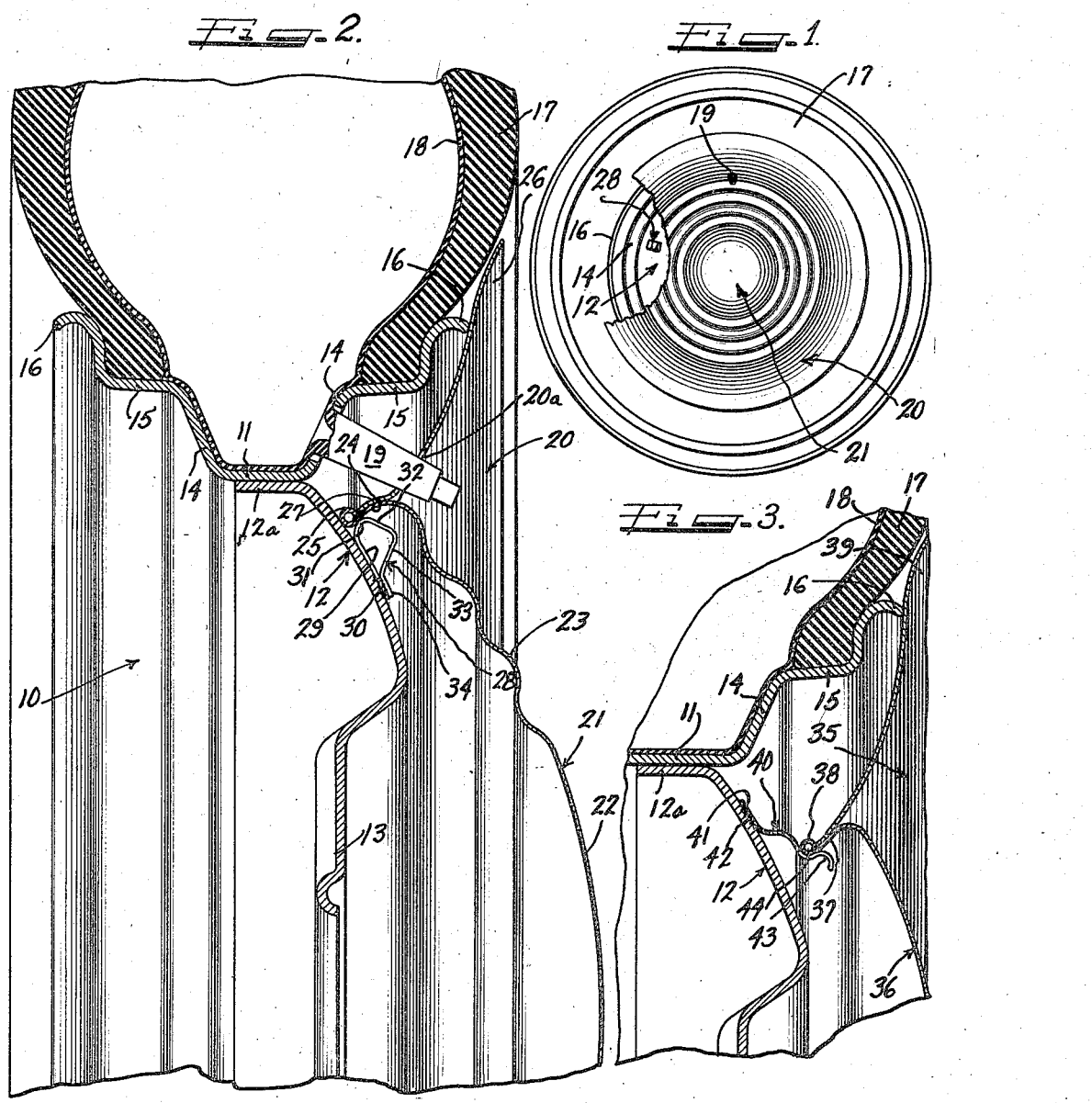
Inventor
GEORGE ALBERT LYON.

Patented Oct. 9, 1945

2,386,241

UNITED STATES PATENT OFFICE 2,386,241

WHEEL STRUCTURE

George Albert Lyon, Allenhurst, N. J.

Application September 6, 1943, Serial No. 501,346

4 Claims. (Cl. 301—37)

This invention is directed to an improved wheel structure and relates more particularly to an improved cover assembly therefor.

It is an important object of the invention to provide improved retaining means for detachably securing a cover assembly over the outer side of a wheel structure.

It is another object of the invention to provide for disposition over the outer side of a wheel structure, a multipart cover assembly including an outer annular portion formed from synthetic plastic material having physical characteristics enabling it to be self-sustaining as to form and yet locally, resiliently flexible whereby it snaps back to its initial position immediately upon the release of deflecting pressures therefrom and a relatively rigid central circular hub cap simulating cover portion constructed from thin sheet metal or the like, said cover portions having adjacent peripheries retainingly engaged with one another, thereby to provide a unitary cover assembly in which the radially outer part extends radially outwardly over the outer side of the radially outer part of the wheel to conceal the same and beyond the wheel to conceal the junction thereof with a tire therein, the radially outer portion of the cover having a cross sectional configuration of such shape that it generally simulates the curvature of the outer side of a tire with which it is associated thereby to give the appearance of being a continuation thereof and a part thereof and particularly a massive white side wall thereof when colored white.

It is still another object of the invention to provide for disposition over the outer side of a wheel structure of the type having a tire rim and a central load bearing portion, a cover assembly having means extending axially inwardly from an intermediate part thereof, said wheel structure having improved resilient clip members on the outer side thereof for detachably engaging said axially inward means for the cover to retain the cover over the wheel structure.

It is still a further object of the invention to provide improved spring clip elements on a wheel structure for maintaining a cover assembly thereon in detachable relationship, said spring clips being provided with a portion engaged to the wheel structure and having another portion arranged for radial inward yielding movement to afford attachment of the cover assembly thereto.

It is still another object of the invention to provide a multi-part cover assembly for disposition over the outer side of a wheel structure, said assembly including a central, relatively rigid, circular hub cap simulating portion provided with an axially inwardly extending flange at the radially outer margin thereof, said flange terminating in a beaded edge, said flange and beaded edge being arranged to retainingly receive the radially inner margin of an outer annular, cover member to provide a unitary assembly.

In accordance with the general features of the present invention there is provided herein, for disposition over a wheel structure having a drop center type tire rim and a central load bearing portion secured thereto, a multi-part cover assembly including a radially outer annular portion formed from synthetic plastic material and a relatively rigid central circular hub-cap simulating portion formed from sheet metal or the like, said central hub cap simulating portion being provided at the radially outer periphery thereof with a bead turned generally radially outwardly, arranged to retainingly receive the inner peripheral edge of the radially outer cover member, said central circular cover member being provided with a circular intermediate hump disposed axially outwardly of the bead to prevent axial outward movement of the edge of the radially outer cover member thereover when the latter is secured thereto from the rear side thereof, there being resilient spring clip members secured to the adjacent portion of the outer side of the wheel structure and arranged to resiliently, detachably engage the inner part of the peripheral margin of the central circular cover member to secure the cover assembly detachably over the outer side of the wheel structure.

Other objects and advantages of the invention will become apparent from the following description and accompanying drawing, in which:

Figure 1 is a side elevational view of a wheel structure embodying my invention, a portion being broken away for illustrative purposes;

Figure 2 is a fragmentary radial cross-sectional view of a wheel structure such as that shown in Figure 1; and Figure 3 is a fragmentary radial cross-sectional view of a modified form of my invention.

It will be understood that the modifications shown herein are for illustrative purposes only and may be changed or modified without departing from the spirit and scope of the invention as set forth in the appended claims.

As will be seen from Figure 2, the wheel structure shown herein as being associated with an embodiment of my invention includes a tire rim 10 of the drop center type having a base flange 11 to which is secured a central load bearing portion 12 by means of a flange 12a formed on the radially outer margin thereof, said flange being riveted or welded to the base flange 11.

The central load bearing portion 12 is further provided with a radially inner bolt-on flange 13 which may be secured in any suitable manner to an appropriate part of the vehicle such as the brake drum or the like.

The tire rim 10 is further provided with opposite side wall flanges 14, opposite intermediate flanges 15 and opposite edge portions 16 between which may be disposed the radially inner parts of a pneumatic tire including a casing 17 and an inner tube 18 provided with a valve stem 19 which may be aligned to extend through a suitable aperture in the adjacent side wall flange 14.

The cover assembly shown herein includes a radially outer annular portion 20 and a central circular hub cap simulating portion 21. The annular portion 20 is preferably formed from synthetic plastic sheet material or the like and has physical characteristics enabling it to be self-sustaining as to form and yet resiliently, locally flexible so that it may be deflected and yet will snap back immediately into its original configuration upon release of the flexing pressures therefrom. The central cover member 21 is preferably formed from more rigid material such as thin sheet metal or the like and is provided with a central crown portion 22, an intermediate corrugated, and thus strengthened portion 23 and a generally axially inwardly extending flange 24 terminating in a rolled bead 25 which serves to reinforce the edge thereof and also to provide for assembling of the parts in a manner to be explained presently.

From Figure 2 it will be seen that the annular cover portion 20 is provided with an aperture 20a which may be aligned with and receive the outer end of the tire valve stem 19, whereby the latter is accessible for insertion of the nozzle of an air hose thereon to permit inflation of the tire.

The annular cover member 20 is further provided with a cross-sectional configuration of such curvature that it substantially simulates the adjacent side will of the tire 17 in the tire rim 10, thus to give the appearance of being a part thereof and a continuation thereof and further to give the appearance of being the white side wall of a massive tire mounted upon a wheel structure of minimum dimensions when colored white. Furthermore, the radially outer portion 26 extends radially outwardly beyond the edge portion 16 thereby to conceal the junction between said edge portion and the tire 17, this portion 26 being flared slightly outwardly to present to the adjacent portion of the surface of the side wall of the tire a smooth riding surface whereby the tire does not become cut circularly upon lateral expansion under load bearing conditions, and under which circumstances it abuts the cover member 20 to urge the same laterally outwardly to a slight degree with each revolution of the wheel.

As will be seen from Figure 2 the radially inner marginal portion of the annular cover 20 is formed, as at 27, to provide a flange adapted to rest in surface engagement with the generally axially inwardly, radially inwardly extending flange 24 of the central circular cover member 21. When in this position, it will be seen that the radially inner edge of the annular cover member 20 bears against the axially outer part of the bead 25 thereby to be securely maintained in position. Furthermore, the cover 20 is applied to the cover 21 from the rear side thereof and is prevented from separating therefrom outwardly by the circularly humped configuration of the intermediate part of the cover 21. With the foregoing construction it will be seen that there is provided herein a multi-part cover assembly in which the cover parts are held securely together as a unitary structure. In assembling the cover parts as shown in Figure 2, it is merely necessary to align the radially inner edge of the cover part 20 with the bead 25 of the cover part 21 and on the axially inner side thereof, whereupon by axial outward movement of the cover member 20 relative to the cover member 21, the parts may be disposed in the position shown.

To the end that the above described cover assembly may be retained upon the wheel structure, there is provided herein a plurality of spring clips 28. These clips are preferably arranged on the outer side of the central load bearing portion 12 of the wheel structure in circular and circumferentially spaced relation to prescribe a circle of such diameter that the bead 25 must be sprung over the clips in attaching the cover to the wheel structure. Each of these spring clips include a supporting arm 29 arranged for surface engagement with the adjacent portion of the outer surface of the central load bearing portion 12 of the wheel. A part of or all of each arm 29 may be riveted or welded to the wheel as shown at 30. Each of the arms 29 extend radially outwardly and merges to a curvate junction portion 31 with an axially outwardly, radially inwardly, obliquely disposed portion 32, the latter portion being formed integrally with a portion 33 which terminates in a finger 34 resting on the portion 29 or welded or riveted thereto.

With the foregoing construction it will be seen that when the cover assembly is aligned concentrically with the circle prescribed by the clips 28 and urged axially inwardly so that the bead 25 engages against the portions 32 of the respective clips, the bead 25 is forced out of round as it progresses axially inwardly over the portions 32 thereof until the curvate portions 31 have been passed, whereupon the bead again snaps back into its circular condition and is drawn in tight wedging engagement between the respective clips 28 and the adjacent portion at the outer surface of the central load bearing portion 12.

In removing the cover from the wheel structure it will be seen that due to the physical characteristics of the annular cover member 20, the latter may be flexed outwardly at a radially outer part thereof to permit insertion of the point of a pry-off tool on the axially inner side of the bead 25, whereupon the outer end of the tool may be moved radially outwardly with the adjacent edge portion 16 as the fulcrum against an intermediate part of the tool to cause the point thereof to move axially outwardly, thus to withdraw the bead 25 axially outwardly over the respective clips 28.

In the construction shown in Figure 3 the wheel and tire construction is substantially similar to that disclosed in Figure 2. In this modification the cover parts 35 and 36 preferably are formed from the same materials and possess the same characteristics as cover parts 20 and 21 respectively of Figure 2.

In this construction the cover member 36 may be provided with the intermediate corrugations such as those shown at 23 in Figure 2, or may be plain as shown in Figure 3. However, in this construction there is provided at the radially outer margin of the cover member 36 a radially inwardly, axially inwardly, obliquely disposed flange 37 which terminates in a rolled beaded edge 38 which may be utilized for securing the same to the wheel structure in a manner to be presently described. In this construction also the outer annular cover member 35 is provided with an outwardly flared, outer marginal portion 39 which is arranged to extend radially outwardly beyond the edge portion 16 of tire rim to conceal the junction between the same and tire 17. At the inner margin thereof, the cover member 35 extends into surface engagement with the outer surface of the flange 37 with the radially inner edge thereof abutting the bead 38 so that the parts are maintained as a unitary cover assembly. In this construction also, the cover member 35 is applied to the cover member 36 means of axial outward movement thereof relative to the cover member 36 from the axially inner side of the latter.

To the end that the cover assembly of Figure 3 may be secured to the wheel structure in detachable engagement therewith there is provided in the assembly of Figure 3 a retaining member including an annular portion 40 having a flange part 41 which may be riveted or welded to the adjacent portion at the outer surface of the central load bearing portion 12 as shown at 42. The remaining part of the annulus 40 is preferably corrugated as shown and extends generally axially outwardly, radially inwardly to be obliquely disposed and terminates in spaced resilient finger members each having an axially outer part 43 providing a radially outer extending hump and an intermediate curvate portion 44 providing a radially outwardly extending groove at the axially inner side of said hump.

Since the outwardly extending retaining fingers and the annulus 40 are resiliently yieldable, the cover assembly, to be attached to the wheel structure, need merely be aligned concentrically therewith, whereupon the assembly is urged axially inwardly against the retaining annulus so that the bead 38 overrides the humps 43 of the retaining fingers to urge the same resiliently radially inwardly a sufficient amount to permit the bead 35 to override the same, whereupon the bead comes to rest in the grooves at the portions 44 to permit the fingers to flex radially outwardly again into the position shown in Figure 3. When the assembly is in the position there shown it will be seen that the cover is retained securely upon the wheel structure and yet is removable therefrom merely by flexing the radially outer portion of the cover member 35 away from the wheel to permit the insertion of a pry-off tool, the point of which may be placed behind the bead 38 to urge the same axially outwardly.

I claim as my invention:

1. As an article of manufacture, a cover assembly including a radially outer annular portion formed from sheet synthetic plastic material and a central circular portion formed from relatively rigid material, said circular portion being formed at the radially outer periphery thereof to provide a generally axially inwardly radially inwardly extending flange formed at the edge thereof to provide a radially outwardly curled resilient edge, said outer annular cover portion being maintained in assembled relationship with the circular cover portion by disposition of the radially inner margin thereof over the radially outer surface of said marginal flange of the circular cover portion with the edge portion thereof abutting the generally axially outer surface of the curled portion of the central circular cover portion.

2. As an article of manufacture, a cover assembly including a radially outer annular portion formed from plastic material and a central circular portion formed from relatively rigid material, said circular portion being formed at the radially outer periphery thereof to provide a generally axially inwardly extending flange formed at the edge thereof to provide a radially outwardly curled resilient edge, said outer annular cover portion being maintained in assembled relationship with the circular cover portion by disposition of the radially inner margin thereof over the radially outer surface of said marginal flange of the circular cover portion with the edge portion thereof abutting the generally axially outer surface of the curled portion of the central circular cover portion.

3. In a wheel structure including a tire rim and a central load bearing portion, retaining means for maintaining a cover assembly over the outer side thereof, said retaining means including a part secured to the wheel and cover engaging members, and a cover assembly including a first circular portion formed from relatively plastic sheet material and a second circular portion formed from a relatively rigid material and disposed concentrically to the first cover portion, said cover portions each having the adjacent parts thereof formed to provide respective, generally axially inwardly extending flanges arranged to lie in substantial surface engagement with one another to provide a composite snap-on flange for a cover assembly, said flange on the relatively rigid cover portion being adapted to engage directly with the cover engaging means thereby to protect the flange of the cover portion from damage during the cover retaining operation.

4. The cover assembly of claim 2 further characterized by the flange of the outer cover portion and the outer margin of the central cover portion being engaged with each other in an inclined plane extending generally radially and axially outwardly whereby to prevent the outer annular portion from being accidentally displaced or separated from the central portion.

GEORGE ALBERT LYON.